UNITED STATES PATENT OFFICE.

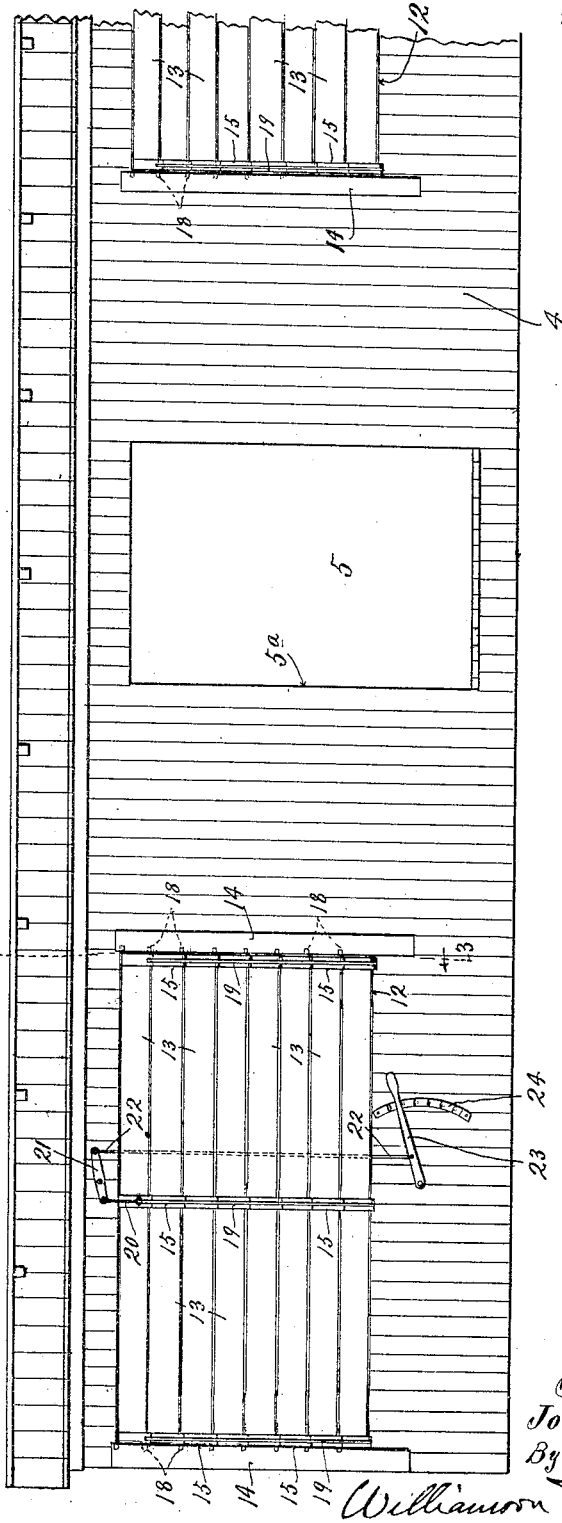

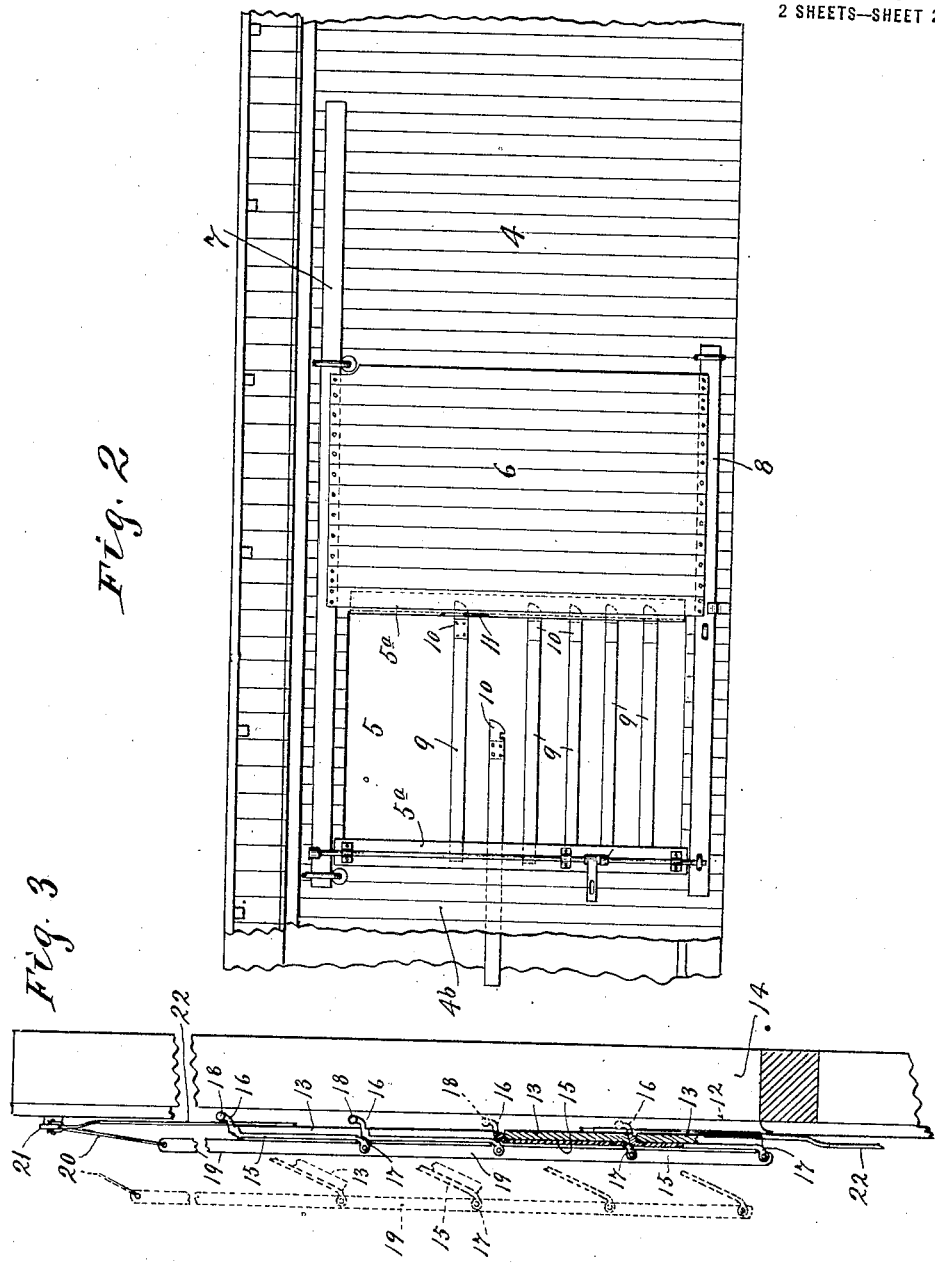

JOHN EDMAN, OF MINNEAPOLIS, MINNESOTA, ASSIGNOR, BY MESNE ASSIGNMENTS, TO PATRICK M. POWER, OF CHICAGO, ILLINOIS.

CONVERTIBLE STOCK AND FREIGHT CAR.

1,337,348.     Specification of Letters Patent.     Patented Apr. 20, 1920.

Application filed July 20, 1918. Serial No. 245,876.

*To all whom it may concern:*

Be it known that I, JOHN EDMAN, a citizen of the United States, residing at Minneapolis, in the county of Hennepin and State of Minnesota, have invented certain new and useful Improvements in Convertible Stock and Freight Cars; and I do hereby declare the following to be a full, clear, and exact description of the invention, such as will enable others skilled in the art to which it appertains to make and use the same.

My invention has for its object to provide an improved convertible box car and stock car; and to such ends, it consists of the novel devices and combinations of devices hereinafter described and defined in the claims.

A box car for shipping various goods should, of course, be a completely closed structure, while a stock car for the shipment of cattle, horses, and other live stock, should be more than well ventilated, that is, it should have large openings or air passages in the sides through which light, as well as air, may pass. My invention provides means for readily converting a car body from the one type above noted to the other and is preferably constructed, as shown in the accompanying drawings, wherein like characters indicate like parts throughout the several views.

Referring to the drawings;

Figure 1 is a side elevation showing the body of the car, some parts being broken away, and the side door for the main entrance for the car being removed.

Fig. 2 is a side elevation showing the central portion of the car body with the side door applied; and Fig. 3 is an enlarged vertical section taken on the line 3—3 of Fig. 1.

The body of the car is indicated by the numeral 4, and, as usual, is provided with the side door openings 5 adapted to be closed by the customary sliding side doors 6 movable on upper rails 7 and lower rails 8.

When the car is used as a stock car the door 6 will, of course be slid to an open position and there secured, and the door opening 5 must be then closed against the passage of animals therethrough, by means of a plurality of bars 9. These gate bars 9 are mounted to slide in suitable seats formed between the sheathing 4$^b$ of the body and through the door posts 5$^a$, and at their outer ends, they are provided with beveled nosed notched latch plates 10 that are adapted to engage and interlock with a notched latch bar 11 rigidly secured on the opposite door post 5$^a$.

When these bars 9 are drawn out and secured across the door opening, light and good ventilation is, of course, afforded through the door opening and at the same time, the stock will be held confined within the car. The door 6 can be moved to an open or closed position, regardless of whether or not the gate bars 9 are extended across the door opening.

In the sides of the car body, in both sides of the main door opening 5 are large window openings 12 that are adapted to be opened and closed at will by shutters 13. These shutters 13 are in the form of flat boards of such length that they fit quite closely within the window openings and between the upright window posts 14. At their ends, the shutters 13 are screwed, bolted, or otherwise secured to metallic hinge straps 15 that have inwardly offset upper ends 16 and outwardly offset lower ends 17. The inner ends 16 of the said straps 15 are provided with laterally projecting trunnions 18 that are pivoted in the window posts 14 and strap ends 17 are pivoted to coupling bars 19. Preferably also, the straps 15 above noted, are applied to the central portions of the shutters, the trunnions 18 being omitted from these intermediate straps. The upper end of the intermediate coupling bar 19 is connected by a short link 20 to one end of a small lever 21 that is intermediately pivoted to the upper portion of the car side and has its other end connected by a long depending rod 22 to a latch lever 23 that is securable in any of several position to a latch arch 24 secured on the lower portion of the side of the car. The coupling rod 22 is extended back of the shutters 13 and the shutters, it will be noted, in moving into open position indicated by dotted lines in Fig. 3, swing outwardly away from the side of the car. Obviously, when the shutters are in their open positions stated, light and good ventilation will be afforded the stock within the car, and at the same time, the shutters will shed or deflect rain outwardly or away from the interior of the car. When the shutters are closed, as shown by full lines in Fig. 3, the window openings will be closed and the car will then be used as a closed box car.

What I claim is:

1. The combination with a car body having window openings in its sides, of horizontally disposed shutter bars hinged in the window openings at their upper edges for outward swinging movements at their lower edges, the opening movements of said shutters projecting the same beyond the sides of the car in oblique positions, coupling devices connecting the free edges of said shutters, and connections to said coupling devices for moving the shutters to and from closed positions.

2. The combination with a car body having window openings in its sides, of horizontally disposed shutter bars for opening and closing said window openings, hinge straps having inwardly offset upper ends and outwardly offset lower ends, said upper ends being pivotally connected to the car body within said window openings, said straps being secured to the respective slats for swinging the same obliquely outward down the sides of the car body, coupling bars connecting the outwardly projected ends of said hinge straps and permitting the shutters to swing into vertically alined closed positions, and connections to said coupling bars for moving said shutters to and from closed positions.

In testimony whereof I affix my signature in presence of two witnesses.

JOHN EDMAN.

Witnesses:
    CLARA DEMAREST,
    BERNICE G. BAUMANN.